United States Patent
Quadrio Curzio

(10) Patent No.: US 8,881,909 B2
(45) Date of Patent: *Nov. 11, 2014

(54) RECOVERY AND UPGRADING PROCESS OF INCINERATIOR BOTTOM ASH FROM MUNICIPAL SOLID WASTE

(75) Inventor: Alessandro Quadrio Curzio, Lecco (IT)

(73) Assignee: PETRACEM S.r.l., Milan (IT)

( * ) Notice: Subject to any disclaimer, the term of this patent is extended or adjusted under 35 U.S.C. 154(b) by 349 days.

This patent is subject to a terminal disclaimer.

(21) Appl. No.: 12/992,762

(22) PCT Filed: Sep. 16, 2008

(86) PCT No.: PCT/IB2008/053741
§ 371 (c)(1),
(2), (4) Date: Jan. 24, 2011

(87) PCT Pub. No.: WO2009/138823
PCT Pub. Date: Nov. 19, 2009

(65) Prior Publication Data
US 2011/0100260 A1 May 5, 2011

(30) Foreign Application Priority Data
May 13, 2008 (IT) .............. MI2008A0864

(51) Int. Cl.
*C04B 18/00* (2006.01)
*C04B 18/06* (2006.01)
*C04B 40/00* (2006.01)
*B03B 9/04* (2006.01)

(52) U.S. Cl.
CPC . *B03B 9/04* (2013.01); *C04B 18/06* (2013.01); *C04B 40/0039* (2013.01)
USPC ............. 209/12.1; 209/38; 106/705; 106/405

(58) Field of Classification Search
USPC .......... 106/403–405, 705–710; 264/109, 115; 209/12.1–40
See application file for complete search history.

(56) References Cited

U.S. PATENT DOCUMENTS

| | | | | |
|---|---|---|---|---|
| 5,002,620 | A * | 3/1991 | King | 156/153 |
| 8,287,783 | B2 * | 10/2012 | Quadrio Curzio | 264/115 |
| 2003/0079656 | A1 | 5/2003 | Lakshmanan et al. | |
| 2006/0162619 | A1 * | 7/2006 | Bethani | 106/705 |

FOREIGN PATENT DOCUMENTS

| | | |
|---|---|---|
| EP | 1382584 A1 | 1/2004 |
| EP | 1749804 A2 | 2/2007 |
| JP | 2003073153 A | 3/2003 |
| JP | 2005040659 A | 2/2005 |
| WO | 02081398 A2 | 10/2002 |
| WO | 2008142607 A2 | 11/2008 |

OTHER PUBLICATIONS

Bertolini L. et al., "MSWI ashes as mineral additions in concrete," Cement and Concrete Research, Pergamon Press, Elmsford, NY, US, vol. 34, No. 10, Oct. 1, 2004, pp. 1899-1906, XP004548728, ISSN 0008-8846, Cited in ISR.

International Search Report, dated Jun. 17, 2009, from corresponding PCT application.

* cited by examiner

*Primary Examiner* — Steven Bos
(74) *Attorney, Agent, or Firm* — Young & Thompson

(57) ABSTRACT

A process for the recovery of bottom ash is characterized by shredding and physical separation phases. The bottom ash undergoes an oxidation treatment of the amphoteric metals contained therein. After the process, the treated bottom ash can be employed as mineral additive for concretes or hydraulic bonding agents.

17 Claims, 1 Drawing Sheet

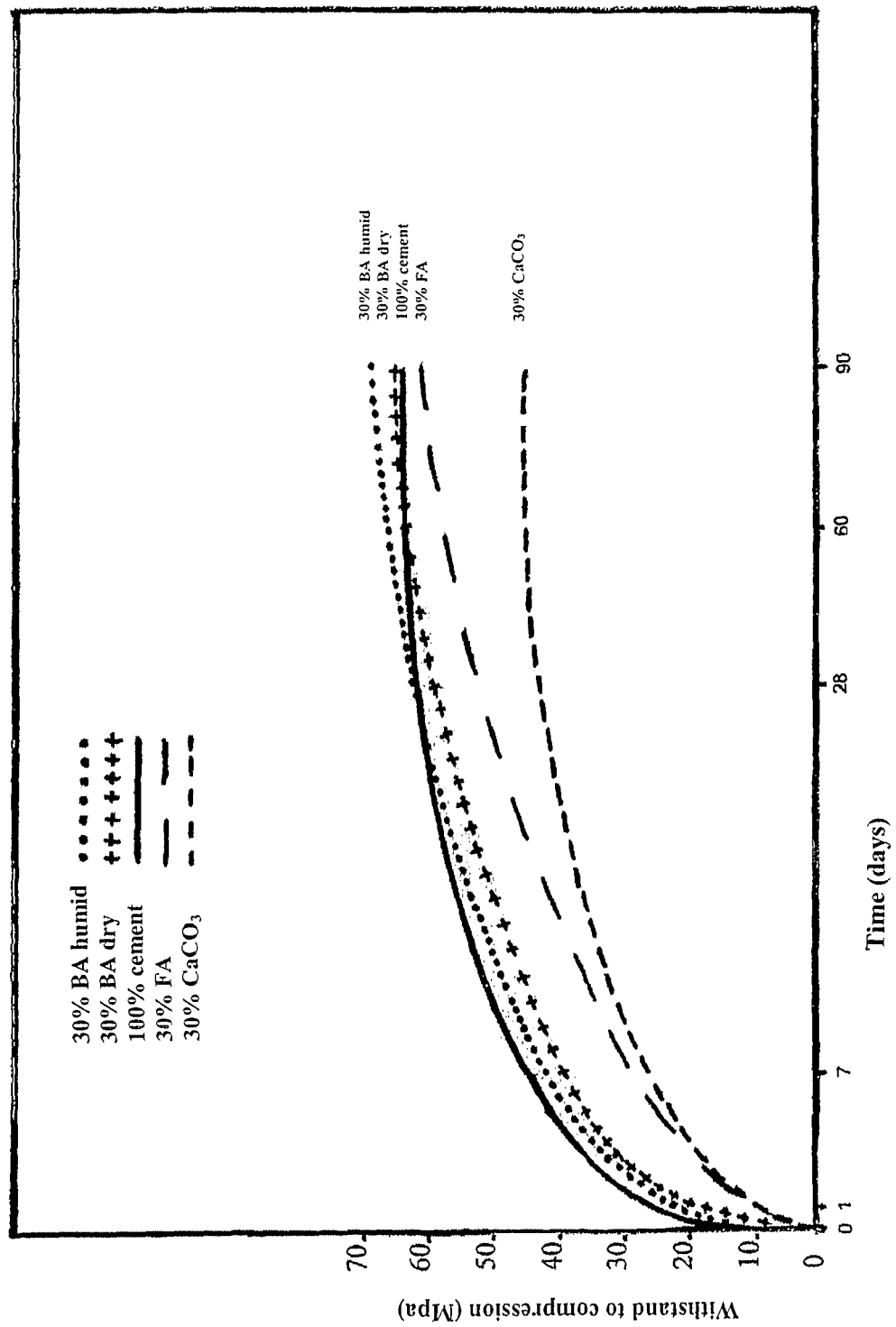

RECOVERY AND UPGRADING PROCESS OF INCINERATIOR BOTTOM ASH FROM MUNICIPAL SOLID WASTE

TECHNICAL FIELD

The present invention refers to a recovery and upgrading process of incinerator bottom ash from municipal solid waste as mineral admixture for concrete. In the context of the same process, minor fractions of a mostly metallic and/or ferromagnetic nature are also quantitatively recovered.

BACKGROUND ART

Despite the repeated appeals by health and environmental authorities, the volume of municipal solid waste and of the wastes which may be assimilated thereto keeps growing everywhere, both because the well-being currently found in parts of the planet implies constantly-growing consumptions, and because the same health authorities require bulkier packagings and often the use of disposable items, especially in case a high level of hygiene is required. Waste disposal is thus a general and invasive problem, particularly in the most industrialised countries where the above-mentioned problems are often matched by lack of space.

So far, also due to the population's problems of acceptance towards the other disposal methods, wastes have been mostly dumped in controlled landfills. Such system, however, is increasingly inadequate, since it requires to constantly find ample spaces, possibly far from residential areas, and causes various forms of environmental pollution; in particular, the liquids originating from waste decomposition and containing various even highly toxic substances, often seep into the water-bearing layer.

The incineration of municipal solid waste, a practice once a source of various toxic gases, is now carried out with greater care, so as to produce virtually only carbon-dioxide and water fumes, which would develop anyway over time even in a landfill. The improvement in the management of these processes, as well as the use thereof for heat and/or electric energy generation, is a reality in the most advanced countries and it is auspicable for it to become increasingly widespread.

At the end of the incineration, between 20% and 30% of the supplied waste remains in the form of bottom ash and/or debris, essentially consisting of the non-combustible fractions and made up mainly by vitreous and/or ceramic materials, coming from the chemical-physical transformations of the combustion process, especially for high temperatures (about 900° C.) which are reached in a correctly-managed incinerator, so as to avoid the building of dioxin and the like. A non-negligible percentage of the bottom ash and/or debris, about 5-20% by weight of the total, consists of material of the ferromagnetic type (metals and non-metals), but there are also metals of the paramagnetic and diamagnetic type.

In Italy and in Europe, bottom ash and/or debris from municipal solid waste incineration and waste assimilated thereto and from RDF (refuse-derived fuel) are classified as non-hazardous waste according to code CER 190112. Based on domestic provisions or specific authorisations, they may possibly be mixed with other same-origin waste.

Such bottom ash and/or debris are normally disposed of in a landfill. Proposals have also been put forward for reusing bottom ash and/or debris—the quantity whereof is in any case decidedly substantial—with special reference to the use thereof as building material.

Some of these proposals concern the use of bottom ash or debris as raw material for clinker production and hence of cement (often referred to as "ECOCEMENT"). This process is limited by the fact that bottom ash, coming from the thermal incineration process (at about 900° C.), must undergo a new thermal process, that of clinkerisation, at 1400-1500° C., to be reused and that does not appear particularly advantageous from an energy-impact point of view, as well as from the point of view of the economic and environmental balance.

Other studies show how bottom ash and/or debris, mainly consisting—as seen—of vitreous and ceramic components, have a pozzolanic potential. However, said bottom ash and/or debris, in addition to being coarse from a granulometric point of view and being rich in metals and various impurities, also contain non-negligible amounts of amphoteric metals, mainly aluminium, which, in a basic environment end hence, even more so, in the water-cement mixtures, originate complex ions and, hence, gaseous hydrogen which expands and, in the last analysis, may completely spoil the finished cementitious product, creating bubbles inside and in some cases possibly causing even hazardous situations.

Also the use of this bottom ash for the building of road beds, or for similar applications is not convincing, both for reasons of an environmental nature, and for the same phenomenon of aluminium corrosion with consequent hydrogen release and resulting expansion phenomena.

PCT WO 02/081 398 suggests wet shredding and aqueous suspension of bottom ash and/or debris to use them as additives for concrete and/or for cement conglomerates. However, since amphoteric metals (mainly aluminium, as said) are extremely ductile, much more so, in particular, than materials of a ceramic and/or vitreous nature which represent most of the ash, at the end of the described shredding in such document such metals remained in pieces of considerable size, so that they were unable to oxidise fully and the previously detected problems, connected to hydrogen release, remained unchanged.

EP 1 382 584 highlights that, during wet shredding of bottom ash and/or debris, corrosion by oxidation of the aluminium therein contained takes place; in order to overcome this, such document provides the preliminary shredding of the bottom ash in an aqueous suspension and the subsequent use thereof for concrete manufacture. However, afterwards, it was evident that simple wet shredding would not be sufficient to solve the problem of hydrogen formation. Moreover, even the subsequent addition of cement in order to raise the pH was not ideal, causing further problems.

With the shredding techniques used which have led both to PCT WO 02/081 398 and to EP 1 382 584, uncoupled with adequate separation and/or filtration phases, the particles of amphoteric metals were probably, in fact, so large (>300 micron) not to be detected during the measuring carried out by the laser granulometer capable of detecting only particles below 300 micron, or, since they represent a very small percentage, normally in the order of 1% by weight, they were quantitatively neglected.

Finally, also the attempts at separating beforehand the paramagnetic metals by special technologies, had produced appreciable results, but had not proven fully effective. In such respect tests had been carried out with equipment exploiting the principles of the so-called "Foucault currents" or detecting the electromagnetic alterations determined by the flow of the para-magnetic metals on conveyor belts, or by similar technologies.

Finally, also the recovery of the mainly metallic, ferromagnetic fractions—which still did not have deleterious effects as in the case of the amphoteric metals—was not an ideal solution, since it allowed the recovery thereof only in limited percentages and did not allow, among other things, to obtain "clean" ferromagnetic metals, i.e. with a very low content of other fractions and/or impurities.

SUMMARY OF THE INVENTION

The problems set forth above are brilliantly solved by the present invention, which refers to a process for the recovery and upgrading of bottom ash comprising mutually integrated or sequential shredding and separation phases, characterised in that said bottom ash undergoes an oxidation treatment of the amphoteric metals contained therein, due to a process comprising one or more phases both of shredding and of separation/filtration. Thereby, the particles of amphoteric metals, difficult to separate fully by techniques such as "Foucault currents" or by detecting the alteration of the magnetic fields, and remarkably more difficult to shred than the ceramic/vitreous ones, are either separated and sent for different recovery/treatment, or reintroduced into the shredding cycle, or even shred and/or treated separately until, in any case, the particles still present are certainly reduced to below the desired dimensions, i.e. such as to allow a quick and controlled oxidation of the same.

In addition to proceeding through one or more shredding and separation phases until reaching the desired fineness, it has been proven convenient also to proceed to the addition of basic and/or alkaline agents, preferably other than cement and able to raise more quickly the material pH; in particular, in case one proceeds with wet shredding, it has been proven extremely effective to introduce these basic and/or alkaline agents to raise the pH of the aqueous suspension as from the shredding phase, so as to promote a combined ("mechanochemical") corrosion and shredding effect of the amphoteric metals. In the case of multiple shredding phases—including the so-called pre-shredding (i.e. a coarse granulometric reduction, generally obtained through mills, crushers, triturators or the like) plus one consisting of two shredding phases—the addition of basic and/or alkaline agents can be made both from the first phase, and from any one of the subsequent phases, and this may be suitable both in case one intends to accelerate the oxidation of the amphoteric metals in a controlled way during a specific phase, and in case one aims at a further separation and at the recovery of the aluminium after a first shredding phase plus separation/physical filtration.

According to a further aspect, the present invention concerns a mineral additive for concrete, hydraulic bonding agents, cements and building materials in general, accomplished by the process according to the present invention.

Finally, according to a further aspect, the process according to the present invention provides the recovery of metal and non-metal materials.

BRIEF DESCRIPTION OF THE DRAWING

The enclosed FIGURE shows the results of a comparison experiment.

BEST WAY TO CARRY OUT THE INVENTION

The bottom ash, collected in a known way after a generic waste incineration process, after the suitable preliminary phases (indicated here as an example in a non-limiting sequence and with the option to reintroduce the fractions obtained from the subsequent filtrations or separations) consisting of the separation of the coarse fractions, dry or wet (preferably wet) pre-shredding, the separation of the ferromagnetic materials, the physical filtration or separation, as well as the possible separation, or at least the reduction of the amount of paramagnetic metals and/or anything else which is considered suitable based on specific features of the bottom ash or debris—which apparently also depends on the types of waste, on any waste sorting, on the treatments and incineration processes—through the known technologies, is collected and brought to shredding. Such shredding may occur, in a known manner, preferably in wet conditions, also for safety reasons linked to the high reactivity of aluminium, but also in dry conditions.

In case one resorts to wet shredding, in aqueous suspension, it is useful to carry out a first shredding phase, preferably in a ball mill or the like, followed by a physical separation phase (i.e. separating according to size or to mass), for example by filtration, with equipment such as a vibrating screen or other according to the known art, or by sedimentation, until the fractions with granulometry above a threshold value ranging between 45 and 400 micron are separated (a filtration with double vibrating screen can also be performed: the first one with a larger span, the second one with a span comprised between 45 and 400 micron). The larger-sized particles are preferably reintroduced into the cycle before the preliminary separation plants, so as to increase to a maximum also the recovery of the metallic and/or ferromagnetic fractions, but they can also be either recovered otherwise or disposed of, while those of a smaller granulometry are supplied to the second shredding phase, with a subsequent further filtration or "physical separation" safety phase of the particles of a size above a threshold value ranging between 45 and 150 micron (screening, sedimentation or the like), to be performed preferably with different equipment, until achieving such a granulometry that all the particles are smaller than 300 micron, preferably smaller than 150 micron and even more preferably smaller than 70 micron, even more preferably smaller than 45 micron and in the best possible way smaller than 20-30 micron, so that very quick and full corrosion of the amphoteric metals is obtained. It is apparent that both the second shredding phase and the filtration one may not be necessary if the first shredding/separation phase was fully reliable and effective.

Among other things, the greater fineness allows to obtain, from the thus-treated bottom ash or debris, a mineral additive having even greater pozzolanic properties due to the greater reactivity resulting from the larger reaction surface. However, on the other hand, too high a fineness (for example D50 1-2 micron, D90 5 micron) with performances not justified by the increase of the shredding costs, would furthermore result in excessive water demand in cementitious mixtures, thereby significantly limiting the usable amount of these mineral additives by cubic meter of concrete. In such respect the optimal fineness values should lie within these intervals: D50 2.5-20 micron.

A further device to put into practice preferably as from the wet shredding phase is furthermore that of adding basic and/or alkaline agents (in the tests carried out lime has been used for simplicity's sake, which proved extremely effective) to raise the pH preferably above 12-12.5 and, on the one hand, to accelerate the oxidation process and, on the other hand, to ease shredding. The particular effectiveness of the addition of alkaline agents as from at least one of the shredding phases (preferably after the pre-shredding phase) is due to the fact that it is particularly effective and quick, for the purpose of the oxidation of the amphoteric metals, but also for the purpose of the shredding, a combined and simultaneous effect of shredding and corrosion/oxidation, due to the fact that the high alkalinity allows a more rapid corrosion of the surface of the amphoteric metals, which is removed by the shredding action and so on ("mechano-chemical action").

The processes described here and mainly aiming at the neutralisation of the amphoteric metals and at the achievement of a mineral additive with pozzolanic properties may be conveniently coupled with separation phases of the ferromagnetic fractions to be performed by means of suitable, known equipment, preferably also following shredding phases (including the so-called preliminary one) which break the bonds between the metallic and/or ferro-magnetic fractions and the ceramic/vitreous ones. For this reason the equipment or apparatuses for the separation of the magnetic fractions can be placed in the most convenient position (material recirculation is of course also possible) and the separated fractions can be further treated, separated and selected according to the prior art to optimise the recovery of the same. For example, it is possible to separate and obtain a significant amount of material with ferro-magnetic properties, mainly consisting of ferro-magnetic minerals, such as magnetite and hematite. After physical separation following the pre-shredding phase or the first shredding phase, also non-ferro-magnetic metals can further be recovered, i.e. paramagnetic and diamagnetic, which, once separated from the main mass of shred debris, can be further submitted to treatments, separations or recovery by means of conventional techniques. Excess waters, presumably rich in fractions of a ceramic/vitreous nature, in addition to part of the other components of bottom ash and/or debris, coming from these further treatments, or parts thereof, can be reintroduced into the main cycle.

In case one decides for dry shredding (always after the previously described suitable preliminary phases), the ash will be fed to a suitable shredding device, for example a mill, in particular a ball mill, rod mill, or other equipment having the same function. Since, in general, bottom ash and/or debris have a certain humidity rate, it will be preferable to use equipment having adequate devices which allow the simultaneous drying thereof or to perform to the same drying otherwise according to the prior art. The mill will in turn be connected to a separation/classification plant able to separate the coarser particles which, after any suitable separations aimed at recovering the metallic and/or ferro-magnetic fractions, can be either—preferably—treated separately, or recirculated for a new shredding cycle, or removed from the cycle (other possible forms of recovery are possible). In case of separate treatment of the coarser particles (a preferred solution, as said) a wet treatment may be suitable according to what has been illustrated in the present invention, following which, taking into account any excessive humidity rate, they may be reintroduced into the cycle with the other material. The classification/separation plant will have to be suitably calibrated and adjusted so as to guarantee that it has separated the particles of amphoteric metals not having a sufficiently small granulometry. Thereby, the low-granulometry particles, even though they contain amphoteric metals, will undergo—once in contact with water in a basic environment—an extremely rapid oxidation which will allow to reach their substantial inertia in an extremely short time (in the sense that the aluminium corrosion process will have substantially run out and hence so will hydrogen building) with respect to the cementitious mixture so that, once mixed with cement, the building of hydrogen bubbles in the resulting concrete and during the subsequent hardening in the manufactured items obtained from the same is not promoted. Preferably, during shredding, all particles of a size above 150 micron and even more preferably all particles sized above 75 micron and even more preferably above 50 micron and most preferably above 35 micron will have to be separated. The separation of the chosen granulometric fraction can be performed with any suitable instrument, generally classifiers, preferably latest-generation ones, fully similar to those used for the final cement classification. These can also work paired with vibrating screens able to separate the coarser fractions. The corrosion process of the amphoteric metals is caused afterwards (and this might also occur at the final user's location) by water addition. Water may be added to the particles in any known way. The amount of water to be added will have to be sufficient to allow the creation of a sufficiently humid and basic environment wherein the corrosion of the amphoteric metals can take place. Such corrosion may be accelerated by adding basic and/or alkaline agents, preferably preliminarily dispersed in the above water. Optimal results have been obtained with lime, either burnt or hydrated. In such respect, a certain water excess will be preferable, which, among other things, will have to take into consideration the average amounts of amphoteric metals found in the bottom ash and/or debris since water "consumption" will depend from these as a result both of the chemical reaction and of the relative heat release with consequent evaporation.

Also in case one proceeds with dry shredding, the same devices already described as in the case of wet shredding apply (with the obvious adaptations required), as concerns the separation and the treatment of the metallic and/or ferro-magnetic fractions, which, once separated, can be conveniently recovered, washed, treated and/or further shred, when necessary, according to the prior art.

Without wanting to be bound to theory, it is believed that the shredding of bottom ash coupled with a simultaneous or subsequent "physical separation" of the coarser particles of amphoteric metals (in addition to the physical and/or magnetic separation of the ferro-magnetic materials)—since they are more difficult to shred—as well as—preferably—a suitable addition of basic and/or alkaline agents, and—in the case of dry shredding—the subsequent addition of water, avoid the problem of hydrogen release in concretes. The previous failures had occurred due to the fact that—with the normally-obtained granulometries—the surface area of the amphoteric metals could not be increased enough to obtain a quick and substantially complete oxidation of the amphoteric metals, as well as due to the fact that the opportunity of adding—preferably as from shredding—basic and/or alkaline agents had not been considered, which oxidation occurs instead in a repeatable manner by operating according to the process of the present invention. The oxidation process of the amphoteric metals—once the bottom ash and/or debris are shred and separated—occurs also normally even without the addition of basic and/or alkaline agents due to the fact that the bottom ash or debris are generally rather basic per se (pH generally 11-12). Nevertheless, the addition of basic and/or alkaline agents, preferably other than cement and quicker than the latter in bringing about a speedy pH increase, is suitable to accelerate the corrosion process and, in the case of wet shredding, even in promoting shredding by the combined mechano-chemical effect. The corrosion of the amphoteric metals is hence accomplished upon wetting (in the case of wet shredding already during shredding), with vigorous hydrogen release. When the mineral additive is mixed with the cement in the ways known in the art, the amphoteric metals are already fully corroded, or corroded to a substantially full degree, so that there are no longer the swelling phenomena detected in the past upon the attempts to use the shred bottom ash as mineral additive for concrete or other, without worrying excessively about the coarse fraction of the shred product. In order to further improve the processes or make the prepared mineral additives more suited to market requirements, the devices illustrated below may be implemented.

a. The wet shredding and filtration phase(s) are performed with a certain water excess (also taking into account the water which will be lost through the reaction with aluminium): this simplifies especially the filtration phases; at the end of the same the aqueous suspension is left to rest in a suitable container where—in addition to the completion of any oxidation processes—the aqueous suspension stabilises by decanting, increasing the concentration, and the exudation water can easily be separated and reintroduced into the production cycle.

b. Once the aqueous suspension has been prepared, or after the dry-shred product has been wetted, it is possible to proceed to the reduction of the water content in order to prepare a dry or low-humidity product (granulate) or even a slurry in order to be able to propose it more easily to a market more used to receiving dry or low-humidity products. For such purpose it will be possible to proceed, where necessary, according to the known art, in a first phase, both with equipment such as filter presses or centrifugal machines (generally down-stream of a flocculation phase). In addition thereto, it will be possible to proceed both to the addition of lime (CaO), which will react with water to convert into $Ca(OH)_2$ and release heat, and to a drying action, and, finally, to the combined action of lime addition and of the further drying and of other possible variants. Among other things, the addition of lime will originate a material with hydraulic properties, as well as pozzolanic ones. It goes without saying that after the humidity-reduction phase, a further disaggregation phase to obtain a well-dispersed and easily manageable powder or granular material may be called for. There are hence diverse further opportunities to obtain optimum mineral additives or proper hydraulic bonding agents or cements from bottom ash and/or debris—once they have undergone the treatment according to the present invention.

c. In the case of dry shredding and separation, it appears useful to provide to the addition of basic and/or alkaline agents, so that once the bottom ash has been suitably wetted, there is a rapid pH increase, so as to trigger very quick aluminium corrosion (as already said, it is preferable for the basic and/or alkaline agents to be pre-dispersed in the wetting water). In this case too, as in the previous one, it can be provided to use quicklime (CaO) and then to obtain the same aluminium corrosion effect and humidity-reduction effect of the finished product.

Even if the processes illustrated above appear preferable, the following ones are further options:

there is also the option of achieving the corrosion of amphoteric metals, even though sometimes longer times are required, through the simple shredding of bottom ash and/or debris (hence without filtration/separation phases) by adding basic and/or alkaline agents which will have to be added preferably from the beginning, but which can also be added at the end of the shredding;

it is also possible to obtain bottom ash or debris of fine or very fine sand with pozzolanic properties from the treatment (shredding+separation+addition of basic and/or alkaline agents); in this case, through shredding it will be possible to limit the process to reducing the size of the particles below 1 mm or 2 mm, and the addition of basic and/or alkaline agents and a certain waiting time will be paramount to ascertain that the corrosion process of the amphoteric metals has actually finished.

Moreover, during the various treatment phases or in the subsequent phases of usage and/or preparation of the final mixture—depending on the features of the bottom ash, of the chosen type of process and of plant, as well as of the products which one intents to obtain—it may be extremely suitable, according to the known art, to use various additives or reactants. Among these, it may be indicatively suitable to use those additives or reactants habitually used in the field of cement products and/or of aqueous suspensions and/or pozzolanic materials, such as for example water reducers, accelerators, agents and/or chemical activators (such as for example $CaCl_2$, $Na_2SO_4$), retardants, air-entraining agents, anti-foaming agents (which, among other things, may promote the removal of the bubbles created by hydrogen release), waterproofers, hydrorepellants, flocculating agents, hardening regulators. In addition thereto, those devices may be implemented or those additives or functional reactants making further inert, neutralising, making harmless or reducing any hazardousness or toxicity of the mineral additive may be used according to the known art.

Moreover, once again treated according to the present invention, the bottom ash and/or debris may be treated to a very high degree and used like the fly ash coming from coal combustion or other natural or artificial pozzolanas, materials on the basis whereof a number of applications have been developed and a number of devices have been identified. For example, the activation with alkali to obtain alternative bonding agents and produce special manufactured items for the building industry.

Finally, concerning the admixture of basic and/or alkaline agents, it must be said that these can be found also as by-products or residues of other industrial processes, such as the basic waters coming from the aluminium decaping processes.

The present invention thereby allows full reuse of the residue of incinerated wastes, per se valueless and which would imply high disposal costs, as mineral additive for concrete, hydraulic bonding agents, cements and cement products in general, best exploiting the pozzolanic properties thereof, so that the bottom ash becomes a product of a certain value, which carries with it takings rather than expenses for whomever manages the waste cycle. Having discovered the need to subject it to a process including shredding and separation phases up to a fine granulometry, and the further device of the admixture of bases and/or alkali (in the wet process as from the shredding), has allowed to overcome the drawbacks found before during use and which seemed impossible to overcome or, at least, whose certain avoidance seemed impossible to foresee.

A very important aspect which, through the present invention, further finds a brilliant solution, is the optimisation of the recovery of minor components, i.e. of the magnetic and non-magnetic metals and of the ferro-magnetic materials. As a matter of fact, after the incineration process, which gives rise to the melting of most of the inorganic matters found in it, said fractions are found mixed with those of a ceramic-vitreous nature and are often covered and/or linked to the same to a greater or lesser degree. This makes the separation thereof more difficult and, in any case, the material is mixed with other fractions and rich in impurities. It is only due to a shredding process, preferably a wet one (with the advantage of a simultaneous washing effect), that the bonds formed during combustion can be broken and the various fractions separated and sent for recovery in the best way. Therefore, a further important advantage of the present invention is that it allows a more effective (which does not mean full) recovery of said fractions. The separation of the ferro-magnetic fractions, the technology whereof appears more tested and effective, especially with small-sized fractions, may take place either before or after the separation/physical filtration phase. In any case, once separated from the mass of the bottom ash and/or debris, also the paramagnetic and diamagnetic metallic fractions can be further shred and/or washed and/or dried and/or separated and/or selected (depending on the sequences which will be chosen for the industrial process). These further treatments on the minor fractions have the enormous advantage that excess waters may be reused in the wet shredding cycle. A tremendous advantage is thereby obtained, over the prior art, both in economic terms and in terms of a lesser production of residues.

In order to better illustrate the present invention, a comparison example is going to be set forth below.

Various plastic mortars were prepared with a methodology similar to what has been provided by the UNI EN 196-1 standard for cements: such tests are clearly indicative of the properties of the pozzolanic additives.

The first, reference sample was prepared with:

| | |
|---|---|
| Standardised sand | 1350 g |
| Portland cement CEM I 52.5R | 450 g |
| Water | 225 g |

The other samples were made similarly to the first one, with the same amounts of standardised sand (1350 g) and of total water (225 g, including the humidity of the material or of the aqueous suspensions), but replacing 30% cement with various mineral additives or fillers, as reported in table 1.

| Sample no. | Features of the mineral additive | Replacement |
|---|---|---|
| 1 | Ground limestone D50 = 18 micron | 30% |
| 2 | Coal ash D50 = 19 micron (FA) | 30% |
| 3 | Dry-treated ash according to the present invention D50 = 6-8 micron (BA) | 30% |
| 4 | Wet-treated ash according to the present invention D50 = 3-4.5 micron (BA) | 30% |

The change of resistance to compression has been measured during a 180-day-long curing. For samples no. 3 and no. 4 the average values are understood to have been obtained from 5 samplings (hence a significant number of cases) of bottom ash and/or debris treated according to the present invention. The results are shown in the drawing, where it can be noticed that both the wet-treated and the dry-treated bottom ash or debris with subsequent wetting, according to the present invention, produce remarkably interesting results, especially if compared to other mineral additives such as the habitually used calcium carbonate and coal ash. A certain variability of results may be due also to the different fineness of the mineral admixtures, but it is highly evident how the bottom ash or debris treated according to the present invention have given very interesting average results.

It is evident that a number of variants are available to the person skilled in the field falling anyway within the scope of the present invention.

The invention claimed is:

1. A process for recovering and upgrading bottom ash, the process comprising:
providing bottom ash collected from a waste incineration process, the bottom ash comprising particles, said particles comprising amphoteric metals;
subjecting said bottom ash to mutually integrated or sequential shredding and separation phases, said shredding phases comprising one or more wet shredding phases and said separation phases comprising separating the particles of said bottom ash having a diameter above 400 μm; and
performing an oxidation treatment of said amphoteric metals during at least one of said one or more wet shredding phases.

2. The process as claimed in claim 1, wherein said separation phases comprise filtration.

3. The process as claimed in claim 1, said separation phases further comprising separating the particles of said bottom ash having a diameter above 150 μm.

4. The process as claimed in claim 1, further comprising recovering the particles of said bottom ash having a diameter below 300 micron.

5. The process as claimed in claim 1, further comprising recovering the particles of said bottom ash having a diameter below 150 micron.

6. The process as claimed in claim 1, further comprising adding basic agents and/or alkaline agents to said bottom ash before, during and/or after one of said one or more wet shredding phases.

7. The process as claimed in claim 1, wherein said bottom ash is subjected to a first wet shredding phase performed in a ball mill, followed by a physical separation phase performed by filtration using vibrating screens or by sedimentation to obtain particles of a predetermined granulometry.

8. The process as claimed in claim 7, wherein the obtained particles are subjected to a second wet shredding phase, with a subsequent physical separation phase.

9. The process as claimed in claim 6, wherein the basic agents are added to the bottom ash to obtain a pH above 12.

10. The process as claimed in claim 1, wherein excess water coming from the process is reintroduced into a wet shredding or separation phase.

11. The process as claimed in claim 1, wherein said separation phases comprise filtration phases, and the one or more wet shredding and filtration phases are performed with excess water.

12. The process as claimed in claim 1, further comprising adding additives or reactants used in cement products and/or pozzolanic materials during the shredding phases or separation phases, said additives or reactants selected from the group consisting of water reducers, accelerators, $CaCl_2$, $Na_2SO_4$, air-entraining retardants, anti-foaming agents, additives for waterproofing, hydrorepellants, flocculating agents, regulators for hardening and mixtures thereof.

13. The process as claimed in claim 1, further comprising recovering metallic material and ferromagnetic material from the bottom ash.

14. The process as claimed in claim 13, wherein the metallic material and the ferromagnetic material are recovered by magnetically separating them from the bottom ash after a preliminary shredding phase prior to a first wet shredding phase and/or after the first wet shredding phase.

15. The process as claimed in claim 6, wherein the alkaline-agents are added to said bottom ash before one of said one or more wet shredding phases.

16. A method of treating bottom ash from incinerated solid waste to produce a mineral admixture, the method comprising:
wet-shredding the bottom ash;
adjusting the pH of the bottom ash to 12 or higher; and
oxidizing amphoteric metals contained within the bottom ash having an adjusted pH of 12 or higher.

17. The method of claim 16, further comprising removing metallic and/or ferromagnetic material from the bottom ash.

* * * * *